Nov. 11, 1969   L. L. MESLER   3,477,474
WIRE REINFORCED CONDUIT
Filed March 22, 1967

INVENTOR
LILBURN L. MESLER
BY Pennie, Edmonds, Morton,
Taylor and Adams
ATTORNEYS

# United States Patent Office 3,477,474
Patented Nov. 11, 1969

3,477,474
WIRE REINFORCED CONDUIT
Lilburn L. Mesler, Palmyra, Mich., assignor to American Chain & Cable Company, Inc., New York, N.Y., a corporation of New York
Filed Mar. 22, 1967, Ser. No. 625,075
Int. Cl. F16l 11/08, 9/12
U.S. Cl. 138—133                                6 Claims

ABSTRACT OF THE DISCLOSURE

A wire reinforced push-pull cable conduit wherein the reinforcing wires are deformed prior to assembly to provide a mechanical interlock between the wires and the plastic sheath which is extended thereover.

BACKGROUND OF THE INVENTION

This invention relates to wire reinforced push-pull cable conduits and is particularly directed to a reinforcing wire of novel configuration which is deformed prior to assembly of the conduit to provide a mechanical interlock with the conduit sheath without materially affecting the physical strength of the conduit.

When an ordinary plastic-lined plastic covered push-pull conduit is bent, the reinforcing wires move generally in the direction of their own axes both relative to one another and relative to the sheath. This results in a tendency of the wires to project beyond the cut end of the conduit. Such undesirable projection of the reinforcing wires may also result from shrinkage of the extruded plastic covering. Furthermore, it has been found that when conduits of this type are employed in control systems of power lawn mowers the vibration of the lawn mower engine will cause axial displacement of the reinforcing wires with respect to the conduit casing and the protruding wires will then interfere with the operation of the controls. Heretofore, the usual solution to this problem has been to restrain the wires by capping the ends of the conduit, a relatively expensive and difficult procedure.

SUMMARY OF THE INVENTION

The push-pull cable conduit of the present invention is of the type having a resinous plastic liner and a resinous plastic sheath. The present conduit includes at least one reinforcing wire wrapped helically with a long pitch radially outwardly of the liner and embedded in the sheath. The wire has a multiplicity of deformations thereon which cause the wires and the sheath to mechanically interlock thereby substantially eliminating axial movement of the wire with respect to the sheath when the conduit is flexed.

As noted above, the reinforcing wires of the conduit of the present invention will not protrude substantially from the cut end of the conduit when the conduit is flexed. This feature eliminates the need for end caps to restrain the wires and simplifies the manufacture of the conduit. Also because special tools are required to install end caps properly, especially in the field, replacement of worn conduits is greatly simplified because all that need be done is cut the conduit to size.

DESCRIPTION OF THE PREFERRED EMBODIMENT

Figure 1:
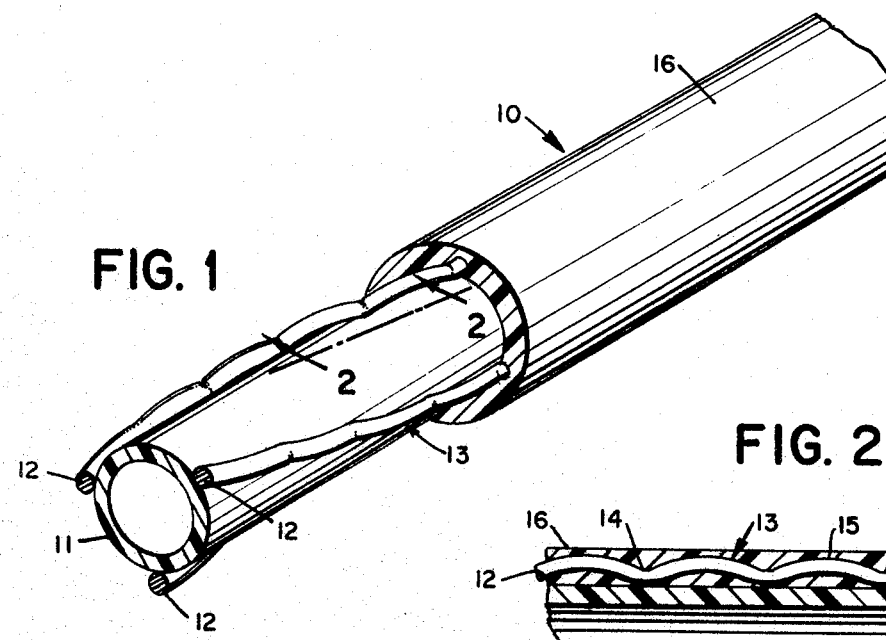
FIG. 1 is a perspective view of the present conduit with the sheath partially cut away.
Figure 2:
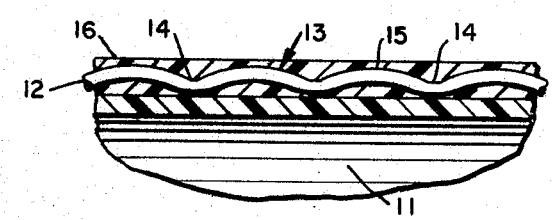
FIG. 2 is a sectional view taken substantially along the line 2—2 of FIG. 1.

Referring initially to FIG. 1, the push-pull cable conduit 10 of the present invention comprises a tubular resinous plastic liner 11. The liner 11 is preferably either a superpolyamide, a polytetrafluorethylene or a high density polyethylene; it is contemplated, however, that other resinous plastics may be found to perform satisfactorily. The term "resinous plastic" includes only those thermoplastic and theromsetting materials which exhibit at least moderate flexibility and high resistance to abrasion.

Figure 3:
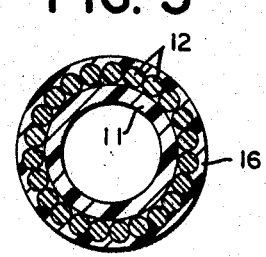
FIG. 3 is a lateral cross section of the present conduit showing reinforcing wires laid side by side.

A plurality of steel reinforcing wires 12 are wrapped helically with a long pitch about the liner 11. The term "long pitch" denotes constructions in which the pitch ratio is equal to or greater than 10:1. The wires 12 may be spaced from one another as shown in FIG. 1 or laid side by side as shown in FIG. 3 as the particular application demands. The term "full complement" is used when the reinforcing wires 12 are laid side by side. This term is intended to mean that whatever the diameter of the wires 12 wrapped about the liner 11, the cumulative clearances between the individual wires 12 will not be so great as to permit the inclusion of an additional wire. This need not mean that the elements are circumferentially abutting since in many instances this is consciously avoided to ensure flexibility of the conduit and adequate penetration of the sheath material.

Figure 4:
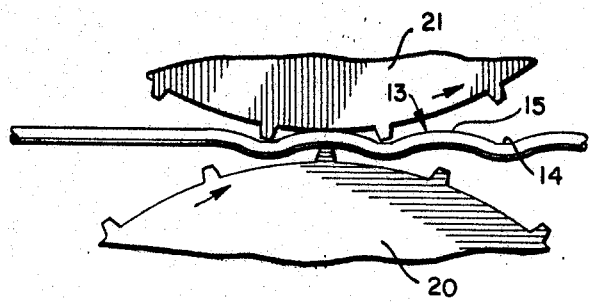
FIG. 4 is an illustration of a method of deforming the reinforcing wires.

The wires 12 are deformed prior to assembly by imparting a series of undulations 13 thereto. Any suitable method of deforming the wires 12 may be employed such as pulling the wire between a pair of rolls 20, 21 as shown in FIG. 4 but the particular method is not part of the present invention. Suitable wire contours also may be obtained either by substantial wire cross section deformation or by knurling, but these techniques are not preferred because they have an adverse effect on the bending fatigue life of the wire. The degree of deformation of undulations 13 must be such as to impart a sufficiently irregular contour to wires 12 without substantially impairing the capacity of wires 12 to withstand longitudinal tensile and compressive forces. For example, if the wires 12 are deformed only slightly, the desired results, as will be explained later on, will not be achieved; however, if the degree of deformation is too great, the wires 12 may behave in a spring-like fashion when a tensile or compressive load is applied and contribute little to the strength of the conduit 10. Although the exact degree of deformation may vary depending upon particular requirements, it has been found that if the depth of undulations 13, as measured from a valley 14 to a crest 15, is at least equal to one-tenth of the diameter of the wire 12 and no greater than one and one-half times the diameter of wire 12, the wire 12 will retain desirable characteristics under tensile stress. Preferably, the depth of the undulations 13 should be approximately equal to one-third of the diameter of the wire 12.

A resinous plastic sheath 16, preferably formed from polypropylene, is extruded over the liner 11 and deformed wires 12. The extruded plastic tends to surround closely and substantially completely the undulations 13 of wires 12 thereby mechanically locking the wires 12 to the sheath 16. When the conduit 10 is flexed or subject to vibration, the undulations 13 being embedded in the sheath 16, prevent each of the wires 12 from being displaced axially with respect to the adjacent portions of the sheath 16, eliminating undesirable projection of the wires 12 beyond the cut end of the conduit 10 without necessitating the use of end caps.

I claim:
1. In a push-pull cable conduit of the type having a tubular liner and a resinous plastic outer sheath, the improvement in combination therewith comprising at least one reinforcing wire wrapped helically radially outwardly of the liner and embedded in the sheath with a long pitch and extending generally axially of said conduit, each wire having a multiplicity of deformations thereon extending transversely to the axis of the wire at spaced locations therealong with the radial spacing of said wire from the tubular liner varying from point to point along its axis in an undulated form to mechanically interlock said wire in said sheath against relative axial movement.

2. A push-pull cable conduit as in claim 1 wherein each wire has a substantially uniform cross-sectional shape throughout its length.

3. A push-pull cable conduit as in claim 2 wherein the depth of each undulation is at least equal to one-tenth of the diameter of the reinforcing wire.

4. A push-pull cable conduit according to claim 3 wherein the depth of each undulation is no greater than one and one-half times the diameter of the reinforcing wire.

5. A push-pull cable conduit according to claim 1 wherein a full complement of reinforcing wires is wrapped radially outwardly of the sheath.

6. A push-pull cable conduit according to claim 1 wherein the liner is of resinous plastic.

References Cited

UNITED STATES PATENTS

| | | | |
|---|---|---|---|
| 2,181,086 | 11/1939 | Bohrer | 138—133 |
| 3,130,754 | 4/1964 | Bratz | 138—133 |
| 3,169,552 | 2/1965 | Fawick | 138—174 |

HENRY S. JAUDON, Primary Examiner

U.S. Cl. X.R.

138—174